(12) United States Patent
Halmos

(10) Patent No.: US 6,292,504 B1
(45) Date of Patent: Sep. 18, 2001

(54) DUAL CAVITY LASER RESONATOR

(75) Inventor: Maurice J. Halmos, Van Nuys, CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/268,757

(22) Filed: Mar. 16, 1999

(51) Int. Cl.[7] .............................. H01S 3/11; H01S 3/115; H01S 3/10; H01S 3/08

(52) U.S. Cl. ............................ 372/97; 372/10; 372/12; 372/17; 372/23; 372/98

(58) Field of Search ................... 372/10, 98, 97, 372/12, 17, 18, 19, 107, 108, 109, 23, 25, 92, 93

(56) References Cited

U.S. PATENT DOCUMENTS

| 3,575,670 | 4/1971 | Hansen . | |
|---|---|---|---|
| 3,622,911 | * 11/1971 | Macartilli | 331/94.5 |
| 5,675,596 | * 10/1997 | Kong et al. | 372/25 |
| 5,822,355 | * 10/1998 | Ahn et al. | 372/97 |
| 5,917,843 | * 6/1999 | Greene | 372/19 |

FOREIGN PATENT DOCUMENTS

| 3301 092 | 1/1983 | (DE) . |
| 0 849 845 | 11/1997 | (EP) . |
| 2 713 836 | 10/1993 | (FR) . |

\* cited by examiner

*Primary Examiner*—Frank G. Font
*Assistant Examiner*—Armando Rodriguez
(74) *Attorney, Agent, or Firm*—Colin M. Raufer; Leonard A. Alkov; Glenn H. Lenzen, Jr.

(57) ABSTRACT

Dual-cavity resonators that may be optimized for multiple functions (operating modes). The dual-cavity resonators provide a first set of operating modes that exhibits low repetition rates (5–20 Hz), high energy per pulse, and long, pulse-width, and a second set of operating modes that exhibits high repetition rates (100–2000 Hz), low energy per pulse, and short pulse-width.

18 Claims, 2 Drawing Sheets

DUAL CAVITY LASER RESONATOR

BACKGROUND

The present invention relates generally to laser resonators, and more particularly, to an improved dual cavity laser resonator having multiple operating modes.

Multi-functionality is typically a requirement for low-cost laser sensors. Multi-functionality many times involves physically opposing laser requirements that are typically solved by compromising performance in any one function. It would be desirable to have a single laser that may be optimized to provide multiple functions.

More particularly, new laser sensors, such as those used in military systems, for example, require multiple-functionality from the laser transmitters used therein to reduce the size, weight, and cost of the sensors. When the requirements have physically opposing characteristics, one may take a compromising approach and not meet all relevant requirements, or use separate lasers optimized for each mode of operation. The first approach typically does not meet customers' desires and/or requirements, and the second approach involves a design of a laser that is double the cost and size. It would therefore be desirable to have a single laser that can meet multi-functional requirements using a single laser transmitter.

Particularly, it would be beneficial to have a single laser resonator that provides one set of operating modes that provides low repetition rates (5–20 Hz), high energy per pulse, and long, pulse-width, and a second set of operating modes that provides high repetition rates (100–2000 Hz), low energy per pulse, and short pulsewidth. Accordingly, it would be advantageous to have an improved dual cavity multi-functional laser resonator that meets these diverse requirements.

SUMMARY OF THE INVENTION

The present invention provides for an innovative approach that implements a dual-cavity resonator that allows for a single laser to be optimized for multiple functions (operating modes). The dual-cavity resonator provides a first set of operating modes that exhibits low repetition rates (5–20 Hz), high energy per pulse, and long, pulse-width, and a second set of operating modes that exhibits high repetition rates (100–2000 Hz), low energy per pulse, and short pulse-width. The multi-cavity resonator is an elegant compact and inexpensive solution to implement such multi-functionality. Using the present invention, multi-functional requirements may be met using a single laser transmitter. The present invention may be advantageously employed in laser systems that require multi-mode operation.

In one embodiment, the dual cavity laser resonator comprises a diode-pumped slab laser, and first and second cavities that are selectively made operational by a spoiler. An electro-optical Q-switch and an output coupler are common to both cavities.

In another embodiment, the dual cavity laser resonator comprises a diode-pumped slab laser, first and second cavities, and a spoiler that selectively inhibits lasing in the selected cavity. The first cavity has a relatively long cavity length and comprises an electro-optical Q-switch and an output coupler. The second cavity has a relatively short cavity length and comprises a passive Q-switch and a partial reflector. The spoiler is selectively disposed in one of the cavities to inhibit lasing in the selected cavity. This embodiment does not require the spoiler to be critically aligned.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
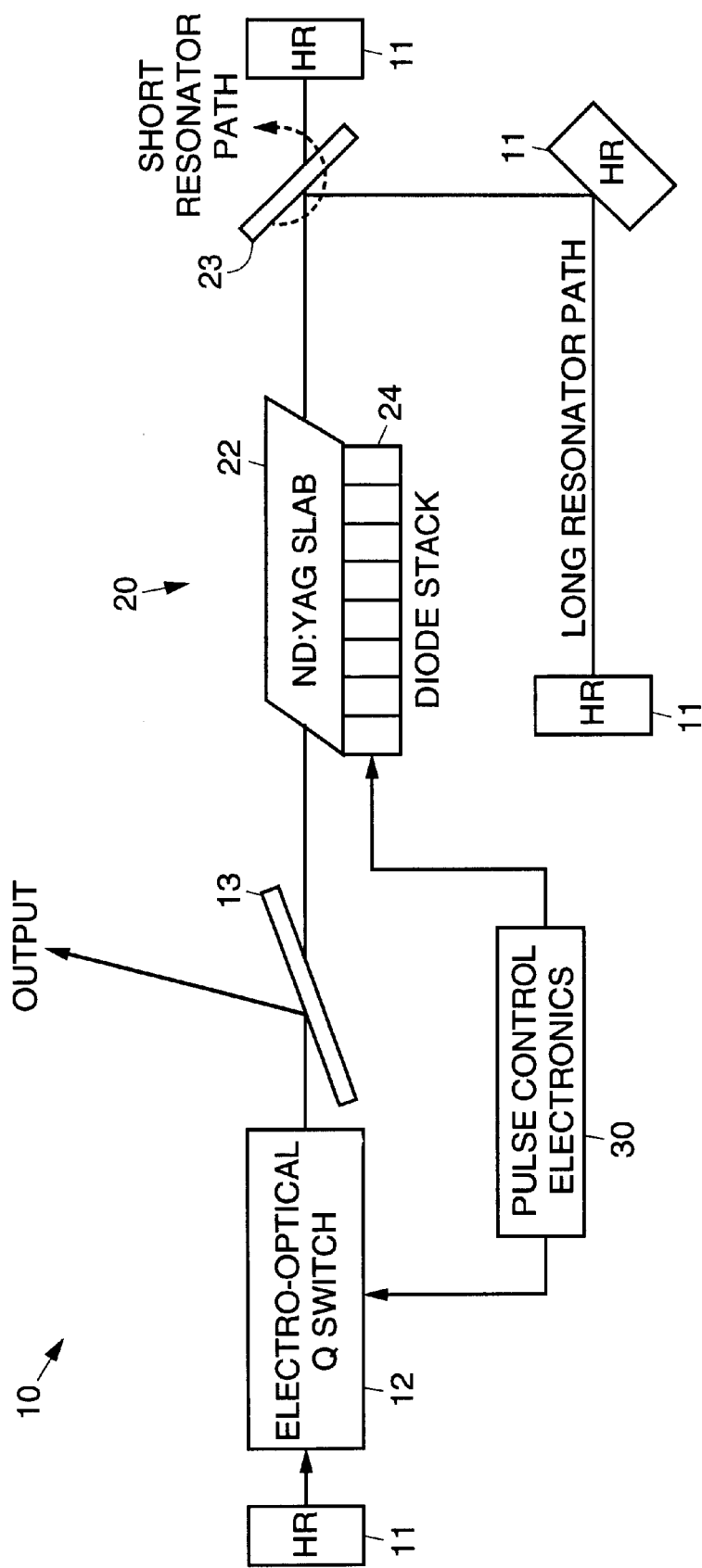
FIG. 1 illustrates a first exemplary embodiment of a dual cavity laser in accordance with the principles of the present invention.

Referring to the drawing figures, FIG. 1 illustrates a first exemplary embodiment of a dual cavity laser 10, or laser resonator 10, in accordance with the principles of the present invention. In particular, FIG. 1 shows a dual cavity Nd:YAG slab laser 20 employing a flip in/out rotatable mirror 23. The dual cavity slab laser 20 comprises two resonators 10a, 10b that share a common gain medium 22, but have different bounce patterns. The operational lasing resonator 10a, 10b (or cavity 10a, 10b) is selected by inhibiting the non-lasing resonator 10b, 10a using the rotatable mirror 23.

Implementations of the dual cavity laser 10 are described in detail below using specific operating parameters, but it is to be understood that the present invention is not limited to these specific operating parameters. In order to produce a laser transmitter capable of generating up to 100 mJ pulses at 10 to 20 Hz with long pulse-widths (15–20 ns) and 40 mJ at 100 Hz with short pulsewidth (<8 ns, for example), the present invention comprises a diode-pumped slab laser 20 along with an output coupler 13. The approach of the present invention extends existing single cavity resonator technology to provide a dual cavity resonator 10, which allows the generation of either short (5–8 ns) low energy or long (15–20 ns) high energy pulses, depending on the chosen mode of operation.

FIG. 1 illustrates a first exemplary embodiment of a dual cavity laser 10 in accordance with the principles of the present invention. The dual cavity laser 10 comprises a diode-pumped, slab laser 20. The diode-pumped, slab laser 20 comprises a diode pumped gain medium 20 that is common to both resonators 10a, 10b. The gain medium 22 may comprise a Nd:YAG gain medium 22. A plurality of pump diodes 24 are provided to pump light into the gain medium 22.

The first embodiment of the dual cavity laser 10 comprises a rear high reflectance reflector 11 (HR) disposed at a first end thereof. An electro-optical Q-switch 12 and an output coupler 13 are disposed between the rear high reflectance reflector 11 and the gain medium 22. Pulse control electronics 30 are coupled to the diode stack 24 and the electro-optical Q-switch 12. The pulse repetition rate is controlled by the diode-pumping rate and the timing of the electro-optical Q-switch 12.

A long pulsewidth high energy cavity 10a comprises one or more high reflectance reflectors 11 disposed on the opposite side of the gain medium 22 from the electro-optical Q-switch 12 adjacent a second end of the high energy cavity 10a. A short pulsewidth, low energy/pulse, high repetition rate cavity 10b comprises a single high reflectance reflector 11 disposed on the opposite side of the gain medium 22 from the electro-optical Q-switch 12 at the second end of the cavity 10b.

The optical switch 23 or flip in/out rotatable mirror 23 is disposed in the optical paths of the cavities 10a, 10b. If the optical switch 23 or flip in/out rotatable mirror 23 is rotated out of the optical path, the short pulsewidth, low energy/pulse, high repetition rate cavity 10b is energized. If the flip in/out rotatable mirror 23 is rotated into the optical path, the long pulsewidth high energy cavity 10a is energized. Rotation is illustrated by the dashed arrow.

As is shown in FIG. 1, both cavities 10a, 10b share the rear high reflectance reflector 11, electro-optical Q-switch 12, and Nd:YAG slab gain medium 22. If short pulse operation is desired, the optical switch 23 or rotatable mirror 23 is rotated out of the optical path, which causes laser light to propagate between the rear high reflectance reflector 11 and the high reflectance reflector II at the opposite end of the short pulsewidth, low energy/pulse, high repetition rate cavity 10b. The short pulsewidth, low energy/pulse, high repetition rate laser beam is reflected off the output coupler 13 as a short pulsewidth, low energy, high repetition rate output beam. The resulting, 5–8 ns, 1.06 μm pulse may be used to pump a nonlinear crystal, such as a KTA OPO or other crystal, for example, to provide 1.5 μm short pulse generation.

For long pulse generation (15–20 ns), the long pulsewidth high energy cavity 10a is used to provide a longer cavity length. If long pulse operation is desired, the optical switch 23 or rotatable mirror 23 is rotated into the optical path, which causes laser light to propagate between the rear high reflectance reflector 11 and the high reflectance reflector 11 at the opposite end of the long pulsewidth high energy cavity 10a. The long pulsewidth high energy laser beam is reflected off the output coupler 13 as an long pulsewidth high energy output beam.

One drawback of the simple approach shown in FIG. 1 is that optical switch 23 or rotatable mirror 23 when in the "on" position (long resonator mode as implemented in FIG. 1) must be critically aligned to the optical axis of the laser 10. In other words, the final resting angle of the optical switch 23 or rotatable mirror 23 determines the direction of the laser beam out of the laser 10.

Another implementation is one that does not require the optical switch 23 or rotatable mirror 23 to be critically aligned. One approach that achieves this is shown in FIG. 2, and is shown using specific numbers of components, but is not limited to the specific configuration that is shown.

Figure 2:
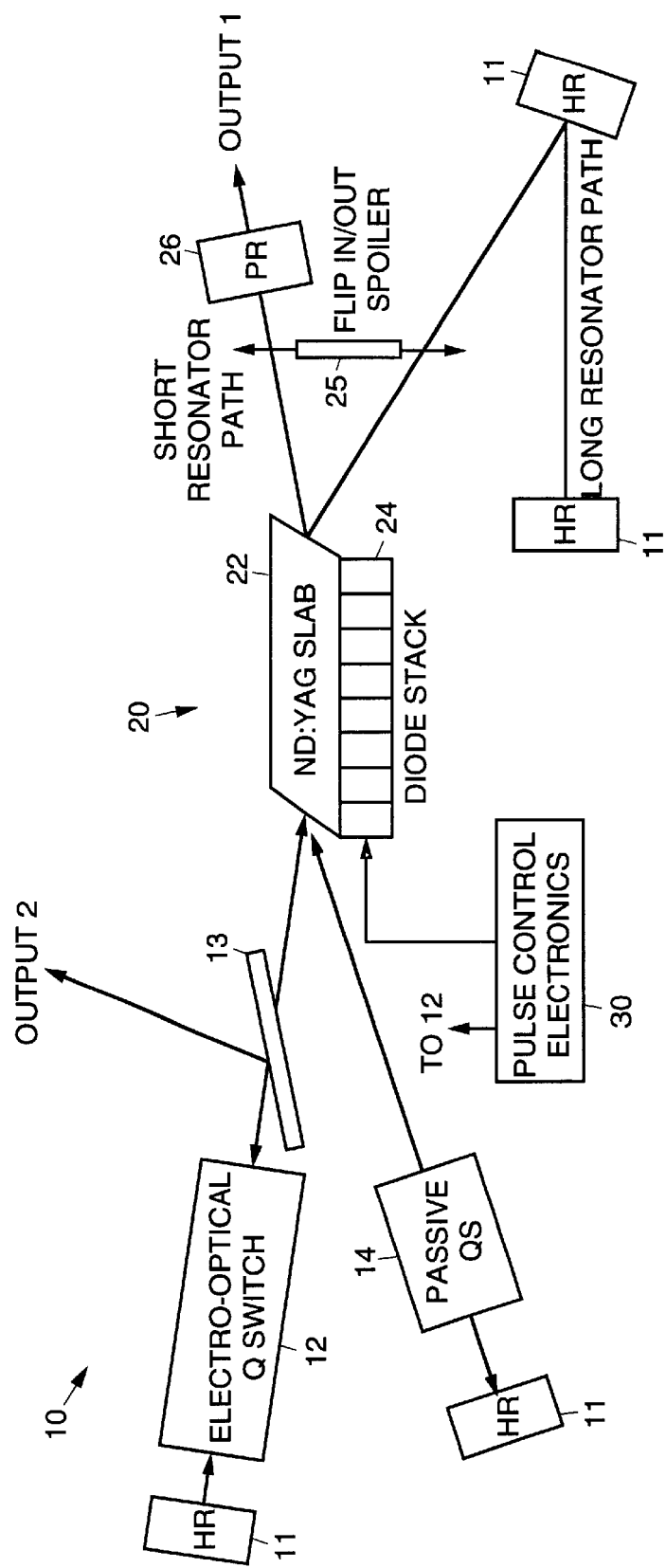
FIG. 2 illustrates a second exemplary embodiment of a dual cavity laser in accordance with the principles of the present invention.

Referring now to FIG. 2 it illustrates a second exemplary embodiment of a dual cavity laser 10 in accordance with the principles of the present invention. In the dual cavity laser 10 shown in FIG. 2, each cavity 10a, 10b has its own Q-switch 12, 14. In the exemplary dual cavity laser 10 of FIG. 2, an electro-optical Q-switch 12 is used for the long pulsewidth high energy cavity 10a, and a passive Q-switch 14 is used for the short pulsewidth, low energy/pulse, high repetition rate cavity 10b. In the second embodiment of the dual cavity slab laser 10, except for the gain medium 22, the two cavities 10a, 10b do not share optical components.

More particularly, the long pulsewidth high energy cavity 10a of the second embodiment of the dual cavity slab laser 10 comprises high reflectance reflectors 11 at each end of the high energy cavity 10a. An electro-optical Q-switch 12 is disposed adjacent one of the rear high reflectance reflectors 11. An output coupler 13 is disposed between the electro-optical Q-switch 12 and the gain medium 22. The gain medium 22 has a plurality of pump diodes 24 (diode stack 24) that couple pump light into the gain medium 22. Pulse control electronics 30 are coupled to the diode stack 24 and electro-optical Q-switch 12. The pulse control electronics 30 functions described in the discussion of FIG. 1.

One or more high reflectance reflectors 11 is used on the opposite side of the gain medium 22 adjacent a second end of the long pulsewidth high energy cavity 10a to create a relatively long resonator path for the laser light produced by the long pulsewidth high energy cavity 10a. A flip in/out spoiler 25 is selectively disposed in the long pulsewidth high energy cavity 10a in order to selectively inhibit lasing in the long cavity 10a.

The short pulsewidth, low energy/pulse, high repetition rate cavity 10b is comprised of a high reflectance reflector 11 at one end and a partial reflector (PR) 26 at the other end of the cavity 10b. The output from the short pulsewidth, low energy/pulse, high repetition rate cavity 10b is provided by the partial reflector 26. A passive Q-switch 14 is disposed between the high reflectance reflector 11 and the gain medium 22. The flip in/out spoiler 25 is selectively disposed in the short pulsewidth, low energy/pulse, high repetition rate cavity 10b in order to selectively inhibit lasing in the short cavity 10b.

The primary advantage of using two cavities 10a, 10b is that each cavity 10a, 10b can be optimized for its specific mission. In particular, the temporal and transverse spatial profile (diameter) of the beam derived from the short cavity 10b can be tailored (as flat-topped as possible) for the purpose of efficiently pumping the nonlinear crystal, such as a KTA OPO or other crystal, for example, without having the additional burden of serving as a high quality, long pulse used for designation. After conversion to 1.5 μm, the beam may be combined with the 1.06 m beam using a dichroic element for collinear output.

An electronically controlled shutter may be used as the flip in/out spoiler 25 to inhibit (spoil) either the short or long cavity 10b, 10a, depending on the choice of operating mode. Pulse control electronics for the diode stack 24 and electro-optical Q-switch 12 will dictate the output pulse formats for each mode of operation while maintaining constant heat load to the slab gain medium 22 so that vertical lensing in the slab gain medium 22 is invariant in all operating modes, regardless of average power requirements.

Thus, improved dual cavity multi-functional laser resonators have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A dual cavity laser resonator comprising:
   a diode-pumped slab laser;
   a first cavity having a relatively long cavity length that includes the diode-pumped slab laser and that comprises an electro-optical Q-switch and an output coupler disposed in the first cavity adjacent to the diode-pumped slab laser;
   a second cavity having a relatively short cavity length that includes the diode-pumped slab laser and that comprises a passive Q-switch and a partial reflector disposed in the second cavity adjacent to the diode-pumped slab laser; and
   a spoiler selectively disposed in one of the cavities for inhibiting lasing in the selected cavity.

2. The laser resonator recited in claim 1 wherein the first cavity comprises:

first and second high reflectance reflectors disposed at opposite ends of the first cavity that define a relatively long cavity length;

an electro-optical Q-switch disposed between the first high reflectance reflector and the slab laser; and an output coupler disposed between the electro-optical Q-switch and the slab laser.

3. The laser resonator recited in claim 1 wherein the second cavity comprises:

a first high reflectance reflector disposed at one end of the second cavity;

a passive Q-switch disposed between the first high reflectance reflector and the slab laser; and a partial reflector disposed at an end of the cavity opposite from the first high reflectance reflector and that defines a relatively short cavity length.

4. The laser resonator recited in claim 1 wherein the diode-pumped slab laser comprises:

a gain medium; and a plurality of pump diodes disposed adjacent to the gain medium for coupling pump light into the gain medium.

5. The laser resonator recited in claim 1 wherein the first cavity comprises a long pulsewidth high energy cavity.

6. The laser resonator recited in claim 1 wherein the second cavity comprises a short pulsewidth, low energy/pulse, high repetition rate cavity.

7. The laser resonator recited in claim 1 wherein the length of the first cavity is selected to generate relatively long high energy pulses, and the length of the second cavity 10*b* is defined to generate relatively short low energy pulses.

8. The laser resonator recited in claim 7 wherein the relatively long high energy pulses are between 15 and 20 ns in length, and the relatively short low energy pulses are between 5 and 8 ns in length.

9. The laser resonator recited in claim 1 wherein the switch comprises an electronically controlled shutter.

10. The laser resonator recited in claim 4 further comprising pulse control electronics are coupled to the plurality of pump diodes and the electro-optical Q-switch.

11. A dual cavity laser resonator comprising:

a diode-pumped slab laser;

first and second cavities that each include the diode-pumped slab laser;

an electro-optical Q-switch disposed adjacent to a first end of the diode-pumped slab laser;

an output coupler disposed in the first and second cavities adjacent to the diode-pumped slab laser for coupling laser light out of the resonator; and apparatus disposed adjacent to a second end of the diode-pumped slab laser for selectively causing lasing in first and second cavities.

12. The laser resonator recited in claim 11 further comprising:

a rear high reflectance reflector disposed adjacent a first end of the slab laser;

the electro-optical Q-switch disposed between the rear high reflectance reflector and the slab laser;

the output coupler disposed between the electro-optical Q-switch and the slab laser;

a second high reflectance reflector disposed at a second end of the first cavity that defines a relatively long cavity length; and a third high reflectance reflector disposed at a first end of the second cavity.

13. The laser resonator recited in claim 11 wherein the diode-pumped slab laser comprises:

a gain medium; and a plurality of pump diodes disposed adjacent to the gain medium for coupling pump light into the gain medium.

14. The laser resonator recited in claim 11 wherein the first cavity comprises a long pulsewidth high energy cavity 10*a*.

15. The laser resonator recited in claim 11 wherein the first cavity comprises a short pulsewidth, low energy/pulse, high repetition rate cavity.

16. The laser resonator recited in claim 11 wherein the length of the first cavity is selected to generate relatively long high energy pulses, and the length of the second cavity is defined to generate relatively short low energy pulses.

17. The laser resonator recited in claim 16 wherein the relatively long high energy pulses are between 15 and 20 ns in length, and the relatively short low energy pulses are between 5 and 8 ns in length.

18. The laser resonator recited in claim 13 further comprising pulse control electronics are coupled to the plurality of pump diodes and the electro-optical Q-switch.

* * * * *